(12) United States Patent
Gastaldi et al.

(10) Patent No.: US 11,981,446 B2
(45) Date of Patent: May 14, 2024

(54) ASSEMBLY FOR A NACELLE OF AN AIRCRAFT ENGINE, SAID ASSEMBLY COMPRISING A FIXED COWL AND A COWL MOUNTED SO AS TO BE ABLE TO MOVE ON THE FIXED COWL

(71) Applicant: Airbus Operations SAS, Toulouse (FR)

(72) Inventors: Umberto Gastaldi, Toulouse (FR); Wolfgang Brochard, Toulouse (FR); Olivier Pautis, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/878,360

(22) Filed: Aug. 1, 2022

(65) Prior Publication Data

US 2023/0040055 A1    Feb. 9, 2023

(30) Foreign Application Priority Data

Aug. 3, 2021   (FR) ...................................... 2108418

(51) Int. Cl.
  *B64D 29/08*   (2006.01)
  *B64D 29/06*   (2006.01)

(52) U.S. Cl.
  CPC ............. *B64D 29/08* (2013.01); *B64D 29/06* (2013.01)

(58) Field of Classification Search
  CPC . F02K 1/80; F02K 1/805; F01D 25/24; B64D 29/06; B64D 29/08
  See application file for complete search history.

(56) References Cited

U.S. PATENT DOCUMENTS

| 8,567,721 B2 | 10/2013 | Voss et al. |
| 11,008,089 B2 | 5/2021 | Crawford et al. |
| 11,060,331 B2 | 7/2021 | Liang et al. |
| 2016/0145918 A1* | 5/2016 | Liang ........................ E05C 3/12 292/99 |
| 2017/0174352 A1* | 6/2017 | Gonzalez Prieto .... B64D 29/06 |

(Continued)

FOREIGN PATENT DOCUMENTS

| CN | 108238262 A | 7/2018 |
| DE | 717795 C | 11/1942 |

(Continued)

OTHER PUBLICATIONS

French Search Report; priority document.

*Primary Examiner* — Andrew H Nguyen
(74) *Attorney, Agent, or Firm* — Greer, Burns & Crain, Ltd.

(57) ABSTRACT

An assembly for a nacelle, which includes a fixed cowl, a movable cowl that is movable between a closed position and an open position, and including an upper edge and a lower edge and, between the two edges, a reinforcing rib. The fixed cowl includes, an upper reinforcing rib and a lower reinforcing rib, a hinge including a fixed part attached to the upper reinforcing rib of the fixed cowl, a movable part attached to the reinforcing rib of the movable cowl, and at least two locks, each one including a first part secured to the lower reinforcing rib and a second part secured to the reinforcing rib of the movable cowl. An assembly of this kind serves to provide access to the inside of the nacelle while ensuring that the cowls remain sufficiently rigid.

8 Claims, 5 Drawing Sheets

(56) References Cited

U.S. PATENT DOCUMENTS

| | | | |
|---|---|---|---|
| 2018/0216379 A1* | 8/2018 | Spoelstra | E05D 3/14 |
| 2018/0222567 A1 | 8/2018 | Lopez Fernandez et al. | |
| 2020/0140105 A1* | 5/2020 | Pretty | F02C 7/00 |
| 2021/0070417 A1* | 3/2021 | Dierksmeier | B64C 1/1461 |

FOREIGN PATENT DOCUMENTS

| | | | | |
|---|---|---|---|---|
| FR | 3088360 A1 * | 5/2020 | | B64D 29/08 |
| FR | 3088360 A1 | 5/2020 | | |

\* cited by examiner

ASSEMBLY FOR A NACELLE OF AN AIRCRAFT ENGINE, SAID ASSEMBLY COMPRISING A FIXED COWL AND A COWL MOUNTED SO AS TO BE ABLE TO MOVE ON THE FIXED COWL

CROSS-REFERENCES TO RELATED APPLICATIONS

This application claims the benefit of the French patent application No. 2108418 filed on Aug. 3, 2021, the entire disclosures of which are incorporated herein by way of reference.

FIELD OF THE INVENTION

The present invention relates to an assembly for a nacelle of an aircraft engine, the assembly comprising a fixed cowl attached to a structure of the nacelle and a movable cowl mounted so as to be able to move on the fixed cowl, to a nacelle comprising such an assembly and to an aircraft comprising at least one such nacelle.

BACKGROUND OF THE INVENTION

An aircraft conventionally comprises at least one nacelle consisting, inter alia, of a fan cowl, inside which there is an engine and other, such as the oil system, electrical systems, etc.

In order to provide maintenance for the components accommodated in the nacelle underneath the fan cowl, the latter is mounted so as to be able to move on a structure of the nacelle by means of hinges positioned at the top of the fan cowl. With the advent of very-high-bypass engines, the fan cowl is very large, and the flexibility of this cowl can result in deformation during flight, which in turn causes an additional drag penalty.

It is therefore necessary to find a different arrangement by means of which it is possible to limit the deformation of the fan cowl while providing access to underneath the fan cowl for maintenance reasons.

SUMMARY OF THE INVENTION

The present invention has an aim of proposing an assembly for a nacelle of an aircraft engine, the assembly comprising a fixed cowl attached to a structure of the nacelle and a movable cowl mounted so as to be able to move on the fixed cowl, and means for moving movable cowl and for ensuring the rigidity of the fixed cowl around the movable cowl.

To that end, what is proposed is an assembly for nacelle of an aircraft, the assembly comprising:
- a fixed cowl that is intended to be attached to a rigid structure of the nacelle and has an opening in its web, forming a window,
  - a movable cowl that is mounted so as to be able to move on the fixed cowl between a closed position in which the movable cowl blocks the window and an open position in which the movable cowl does not block the window, and comprising an upper edge that is intended to be oriented towards the top of the nacelle and a lower edge on the opposite side from the upper edge, the movable cowl having a reinforcing rib between its upper edge and its lower edge, the fixed cowl comprising, in continuation of the reinforcing rib of the movable cowl, an upper reinforcing rib which extends from that edge of the window corresponding to the upper edge and a lower reinforcing rib which extends from that edge of the window corresponding to the lower edge,
- at least one hinge, where each hinge comprises a fixed part in the form of a female clevis attached to the upper reinforcing rib along the upper edge of the fixed cowl, a movable part in the form of a male fitting attached to the reinforcing rib of the movable cowl, where the movable part is accommodated in the fixed part, and a pin mounted between the fixed part and the movable part and in which each pin is parallel to the upper edge,
- at least two locks arranged along the lower edge of the movable cowl, where each lock comprises a first part secured to the lower reinforcing rib, a second part secured to the reinforcing rib of the movable cowl, locking means that are able to move between a locking position which locks the first part and the second part to one another and an unlocking position in which the first part and the second part are free with respect to one another, and actuation means that are provided in order to move the locking means from the locking position to the unlocking position and vice versa,
- a fitting to which are attached the fixed parts,
- a fitting to which are attached the movable parts,
- a fitting to which are attached the first parts and
- a fitting to which are attached the second parts, and
- wherein each fitting is attached on one hand to the corresponding reinforcing rib, and on the other hand to the cowl bearing the corresponding reinforcing rib.

An assembly of this kind serves to provide access the inside of the nacelle while ensuring that the cowls remain sufficiently rigid.

Advantageously, each reinforcing rib comprises two sub-ribs that are remote from one another, where each sub-rib bears an element of each pair, specifically of the pair of fixed parts, of the pair of movable parts, of the pair of first parts and of the pair of second parts.

Advantageously, the assembly comprises a seal attached to the fixed cowl along the edges of the window, and the fitting to which the movable parts are attached comprises, along the upper edge, an extension which, in the closed position, is against the seal on the opposite side from the fixed cowl.

Advantageously, the assembly comprises a seal attached to the fixed cowl along the edges of the window, and the fitting to which the second parts are attached comprises, along the upper edge, an extension which, in the closed position, is against the seal on the opposite side from the fixed cowl.

Advantageously, the assembly comprises, along a front edge of the movable cowl, at least one complementary lock, where each complementary lock comprises a first part secured to the fixed cowl, a second part secured to the movable cowl, locking means that are able to move between a locking position which locks the first part and the second part to one another and an unlocking position in which the first part and the second part are free with respect to one another, and actuation means that are provided in order to move the locking means from the locking position to the unlocking position and vice versa.

Advantageously, the actuation means are a handle that is accessible from outside the nacelle, the handle is able to move between a retracted position, in which it is inside a recess provided to that end in the movable cowl or the fixed cowl, and a deployed position, in which it is outside the recess and stands proud of the cowl in question, and the retracted position corresponds to the locking position and the deployed position corresponds to the unlocking position.

The invention proposes a nacelle of for an aircraft comprising a rigid structure and an assembly according to one of the preceding claims, the fixed cowl being attached to the rigid structure.

The invention proposes an aircraft comprising at least one nacelle according to the preceding variant.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
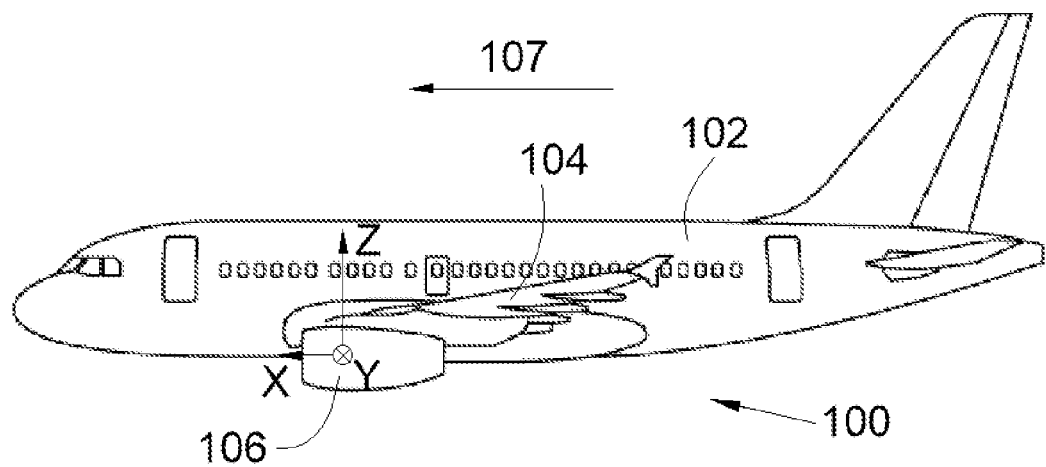
FIG. 1 is a side view of an aircraft according to the invention.

In the following description, terms relating to a position are considered in relation to an aircraft in a normal flight position, i.e., as shown in FIG. 1.

In the following description, and by convention, the X direction is the longitudinal direction of the jet engine, which is parallel to the longitudinal axis of the aircraft, the Y direction is the transverse direction, which is horizontal when the aircraft is on the ground, and the Z direction is the vertical direction, which is vertical when the aircraft is on the ground, these three directions X, Y and Z being mutually orthogonal.

FIG. 1 shows an aircraft 100 which has a fuselage 102, on either side of which there is attached a wing 104 which bears a propulsion system 106 such as a turbofan, for example. The arrow 107 indicates the direction of forward advance of the aircraft 100.

Figure 2:
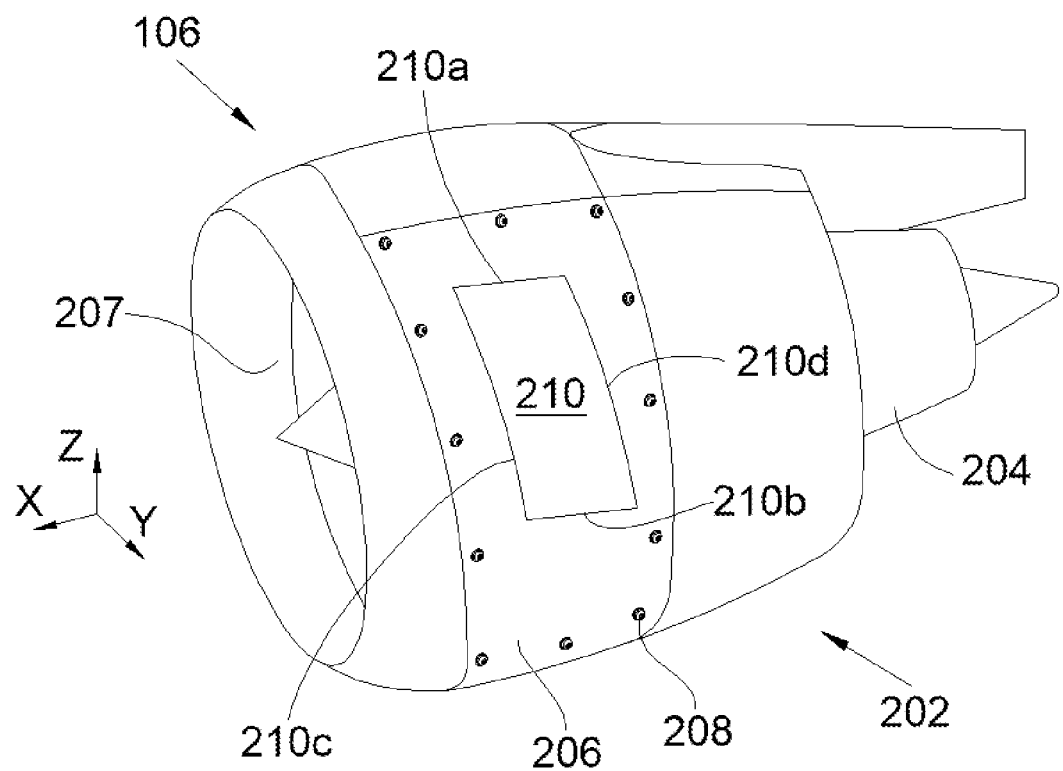
FIG. 2 is a perspective view of a nacelle of an assembly according to the invention.

FIG. 2 shows the propulsion system 106, which comprises a nacelle 202 surrounding an engine which is represented here by its exhaust nozzle 204.

The nacelle 202 comprises a rigid structure and a fixed cowl 206 which is attached to the rigid structure, and which is, in this case, a fan cowl. The fixed cowl 206 is attached by any appropriate attachment means 208, such as screws, rivets and the like, distributed in particular around the perimeter of the fixed cowl 206. This attachment provides a good hold of the fixed cowl 206 on the rigid structure, and the fixed cowl no longer experiences deformation.

Although the invention is more particularly described in the context of a fan cowl, the invention may apply to all the cowls of the nacelle 202, and in particular to the cowl surrounding the air intake 207 of the nacelle 202 (also referred to as the "air inlet outer surface").

In order to provide access to beneath the fixed cowl 206, the fixed cowl 206 has an opening in its web, forming a window, and the nacelle 202 also comprises a movable cowl 210 which is mounted so as to be able to move on the fixed cowl 206, between a closed position in which the movable cowl 210 blocks the window and an open position in which the movable cowl 210 does not block the window.

Figure 3:
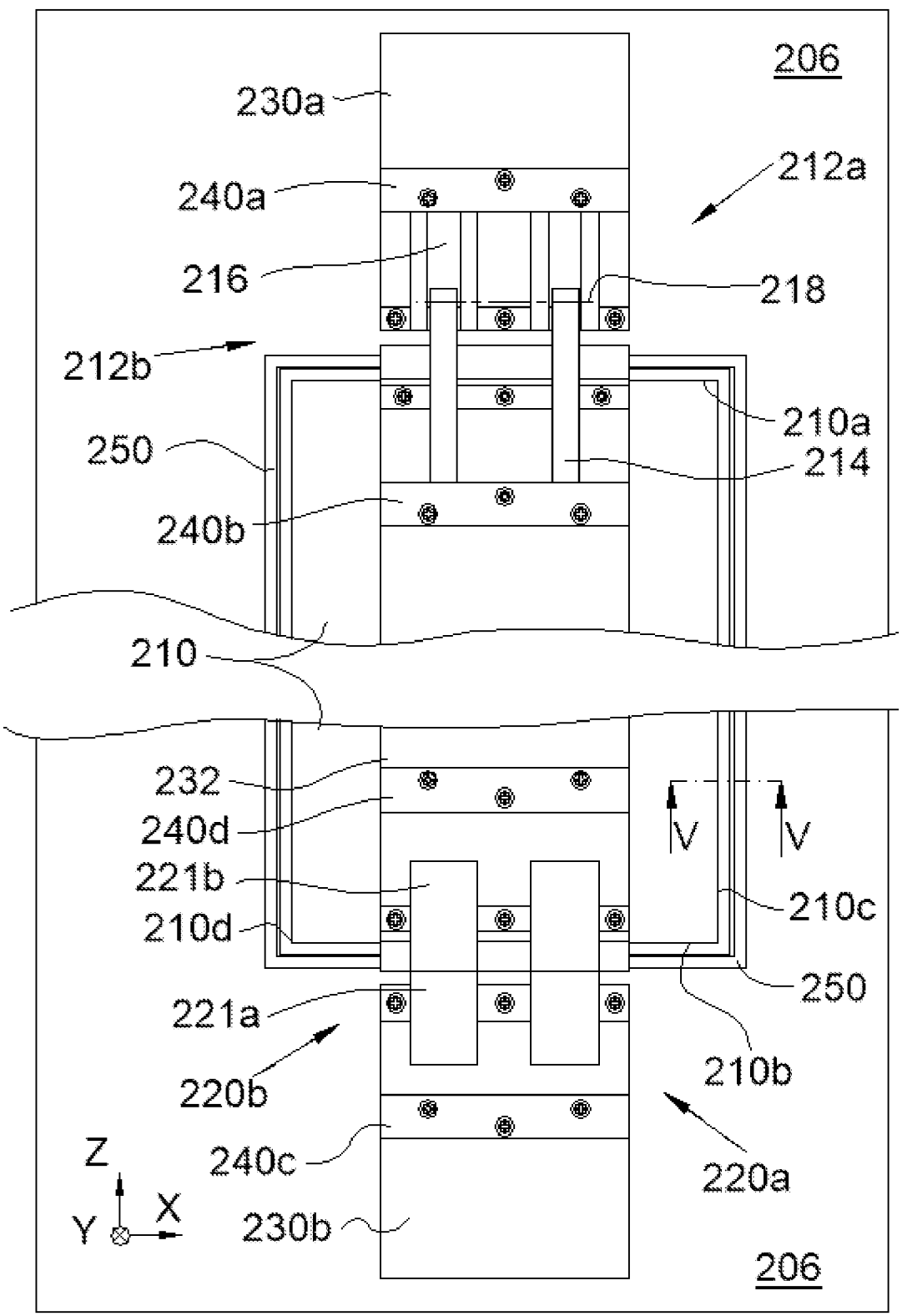
FIG. 3 is an inside view of an assembly according to the invention.
Figure 4:
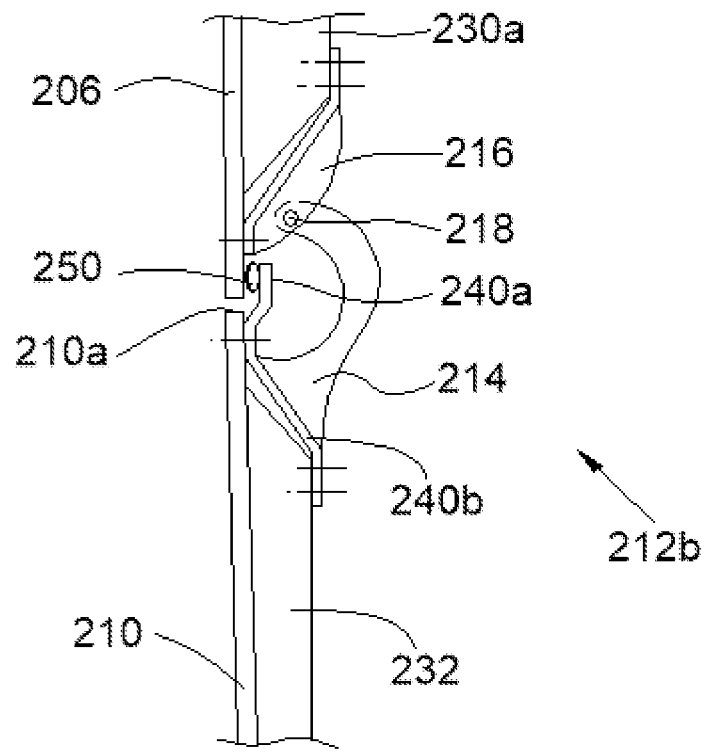
FIG. 4 is a side view of the assembly in FIG. 3.
Figure 4:
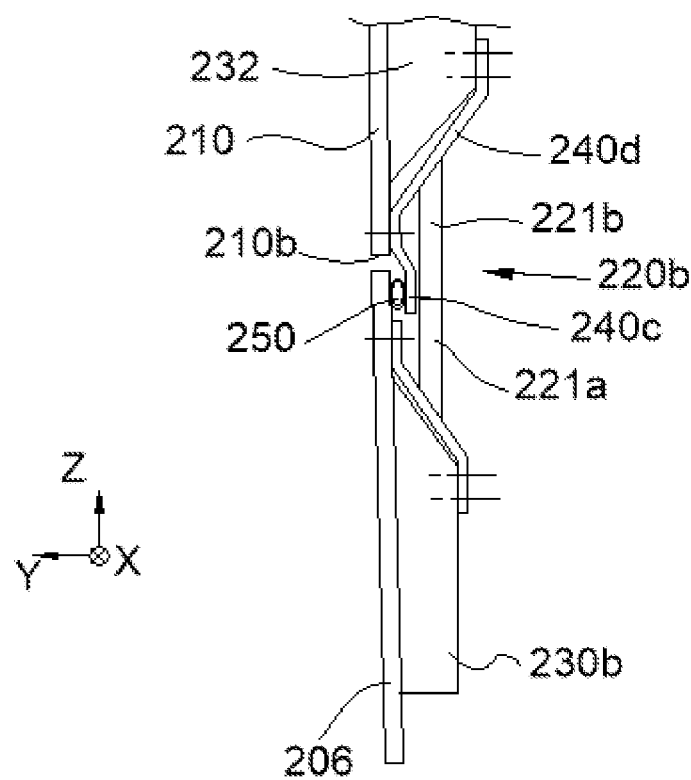

FIG. 3 and FIG. 4 show the interior of the nacelle 202 and of the fixed cowl 206 and movable cowl 210.

The movable cowl 210 is generally rectangular in shape and comprises an upper edge 210a oriented towards the top of the nacelle 202, a lower edge 210b oriented towards the bottom of the nacelle 202, away from the upper edge 210a, a front edge 210c oriented towards the front of the nacelle 202 and a rear edge 210d oriented towards the rear of the nacelle 202, away from the front edge 210c. The edges 210a-d of the movable cowl 210 follow the edges of the window of the fixed cowl 206.

In order to move the movable cowl 210 with respect to the fixed cowl 206, the nacelle 202 comprises at least one hinge, preferably two hinges 212a-b as shown in the figures. For each hinge 212a-b, the fixed part 216 of the hinge 212a-b is attached to the fixed cowl 206, the movable part 214 of the hinge 212a-b is attached to the movable cowl 210 and the pin 218 is mounted between the fixed part 216 and the movable part 214 of the hinge 212a-b in order to articulate the hinge 212a-b.

The hinges 212a-b are arranged along the upper edge 210a of the movable cowl 210, and each pin 218 is generally parallel to the upper edge 210a.

In the embodiment of the invention presented in FIG. 4, the hinge 212a is of the type comprising a gooseneck fitting, but it may be of a different type, such as a piano hinge comprising continuous or discontinuous sectors, or of a number greater than or less than the two hinges shown, without this affecting the scope of the invention.

In order to lock the movable cowl 210 in the closed position, the nacelle 202 comprises at least two locks 220a-b arranged along the lower edge 210b. Each lock 220a-b comprises a first part 221a secured to the fixed cowl 206, a second part 221b secured to the movable cowl 210, locking means, for example of the bolt type, that are able to move between a locking position which locks the first part 221a and the second part 221b to one another and an unlocking position in which the first part 221a and the second part 221b are free with respect to one another, and actuation means that are accessible from outside the nacelle 202, for example of the handle type, and are provided in order to move the locking means from the locking position to the unlocking position and vice versa.

Thus, once the locking means have been positioned in the unlocking position, the movable cowl 210 can be moved around the axis 218 of the hinges 212a-b from the closed position to the open position. In reverse, once the movable cowl 210 has been moved from the open position to the closed position, the locking means can once again be moved into their initial locking position.

In order to strengthen the fixed cowl 206 and the movable cowl 210 in the region of the hinges 212a-b and the locks 220a-b, the fixed cowl 206 and the movable cowl 210 respectively each comprise one reinforcing rib 230a-b on the fixed cowl 206 and another reinforcing rib 232 on the movable cowl 210.

Thus, the movable cowl 210 has a reinforcing rib 232 which extends over its height between its upper edge 210a and its lower edge 210b and to which the movable part 214 of each hinge 212a-b is attached close to an upper face located in the region of the upper edge 210a, and to which the second part 221b of each lock 220a-b is attached close to a lower face located in the region of the lower edge 210b. Preferably, the reinforcing ribs 232 also extend over the width of the movable cowl 210, between its front edge 210c and its rear edge 210d.

The fixed cowl 206 comprises, in continuation of the reinforcing rib 232 of the movable cowl 210, a reinforcing rib 230a-b, that is to say, an upper reinforcing rib 230a which extends from that edge of the window corresponding to the upper edge 210a, and a lower reinforcing rib 230b which extends from that edge of the window corresponding to the lower edge 210b.

Close to the upper edge 210a, the fixed part 216 of each hinge 212a-b is attached to the upper reinforcing rib 230a; close to the lower edge 210b, the first part 221a of each lock 220a-b is attached to the lower reinforcing rib 230b.

For each hinge 212a-b, the fixed part 216 takes the form of a female clevis attached to the upper reinforcing rib 230a along the upper edge 210a of the fixed cowl 206, and the movable part 214 takes the form of a male fitting attached to the reinforcing rib 232 of the movable cowl 210, the movable part 214 being accommodated in the fixed part 216.

The installation of the reinforcing ribs 230a-b and 232, and fact that the hinges 212a-b and the locks 220a-b are attached to these reinforcing ribs 230a-b and 232, make it possible for the forces experienced by the movable cowl 210 to be transferred to the fixed cowl 206 and to the structure of the nacelle 202 via the hinges 212a-b, the locks 220a-b and the reinforcing ribs 230a-b and 232.

In the embodiment of the invention presented here, each reinforcing rib 230a-b, 232 is a single component that respectively bears the pair of fixed parts 216, the pair of movable part 214, the pair of first parts 221a and the pair of second part 221b, but each reinforcing rib 230a-b, 232 may consist of two sub-ribs that are remote from one another, with each sub-rib bearing an element of each pair.

Thus, an assembly according to the invention comprises the fixed cowl 206, the movable cowl 210, the hinges 212a-b, the locks 220a-b and the reinforcing ribs 230a-b and 232. According to an alternative embodiment, the reinforcing ribs 230a-b and 232 could be replaced with a local increase in thickness of the panels, by adding an internal honeycomb core held between two outer skins so as to form what is referred to as a sandwich panel.

In order to avoid increases in drag, the hinges 212a-b, the locks 220a-b and the reinforcing ribs 230a-b and 232 are arranged inside the nacelle 202, that is to say, on those faces of the movable cowl 210 and fixed cowl 206 which are oriented towards the inside of the nacelle 202.

In order to improve the transfer of forces, for the fixed parts 216, for the movable parts 214, for the first parts 221a and for the second parts 221b, the assembly comprises an intermediate fitting 240a-d which attaches the fixed part 216, the movable part 214, the first part 221a or the second part 221b to the ends of their respective corresponding reinforcing ribs 230a-b, 232. Thus, each fitting 240a-d bears the fixed parts 216, the movable parts 214, the first parts 221a or the second parts 221b and is attached, on one hand, to the corresponding reinforcing rib 230a-b, 232 and, on the other hand, to the cowl 206, 210 bearing the corresponding reinforcing rib 230a-b, 232.

Thus, the invention provides a fitting 240a to which are attached the fixed parts 216, a fitting 240b to which are attached the movable parts 214, a fitting 240c to which are attached the first parts 221a and a fitting 240d to which are attached the second parts 221b.

Each fitting 240a-d is attached in this case by screws which are screwed into the corresponding reinforcing rib 230a-b, 232, and screws which are screwed into the corresponding cowl 206, 210.

In the embodiment of the invention presented here, each reinforcing rib 230a-b, 232 is a single component that respectively bears the pair of fixed parts 216, the pair of movable parts 214, the pair of first parts 221a and the pair of second part 221b, but each reinforcing rib 230a-b, 232 may consist of two sub-ribs that are remote from one another, with each sub-rib bearing an element of each pair.

In order to ensure leak-tightness at the upper edge 210a, the assembly comprises a seal 250 which is attached to the fixed cowl 206 along the edges of the corresponding window.

The fitting 240b to which the movable parts 214 are attached comprises, along the upper edge 210a, a continuation which, in the closed position, is against the seal 250 on the opposite side from the fixed cowl 206 so as to compress the seal 250.

In the same manner, in order to ensure leak-tightness at the lower edge 210b, the fitting 240d to which the second parts 221b are attached comprises, along the lower edge 210b, a continuation which, in the closed position, is against the seal 250 on the opposite side from the fixed cowl 206 so as to compress the seal 250.

Figure 7:
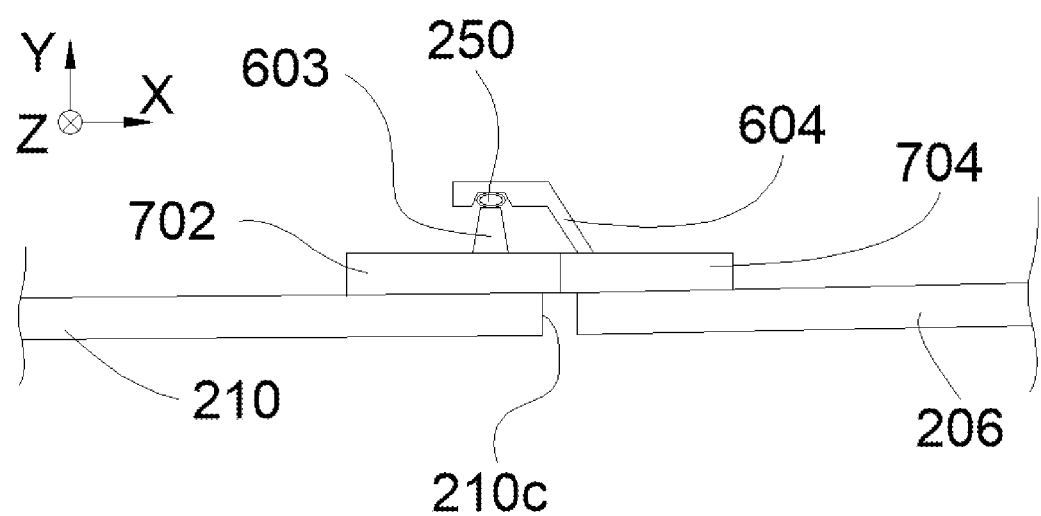
FIG. 7 is a view similar to FIG. 5 for a third variant of the holding system.

FIG. 7 shows one particular embodiment of the invention. Preferably, in order to limit the scooping phenomena that arise from separation of the front edge 210c, the assembly comprises at least one complementary lock 702, 704 in the region of the front edge 210c in order to lock and align the front edge 210c and the corresponding edge of the window. This or these complementary locks 702, 704 can be closed only if the locks of the lower edge 210b are closed. This will make it possible to check whether the movable cowl 210 is properly closed prior to takeoff.

Just like for the earlier locks, each complementary lock comprises, along the front edge 210c, a first part 704 secured to the fixed cowl 206, a second part 702 secured to the movable cowl 210, locking means, for example a bolt, that are able to move between a locking position which locks the first part 704 and the second part 702 to one another and an unlocking position in which the first part 704 and the second part 702 are free with respect to one another, and actuation means that are provided in order to move the locking means from the locking position to the unlocking position and vice versa.

The actuation means are, for example, a handle accessible from outside the nacelle 202. The handle is able to move between a retracted position in which it is inside a recess provided for that purpose in the movable cowl 210 or the fixed cowl 206, and a deployed position in which it is outside the recess and therefore stands proud of the cowl in question.

The retracted position corresponds to the locking position and the deployed position corresponds to the unlocking position. An arrangement of this kind makes it possible to visually check that each complementary lock is properly in the locking position, that is to say, with the handle in the retracted position, prior to takeoff.

Figure 5:
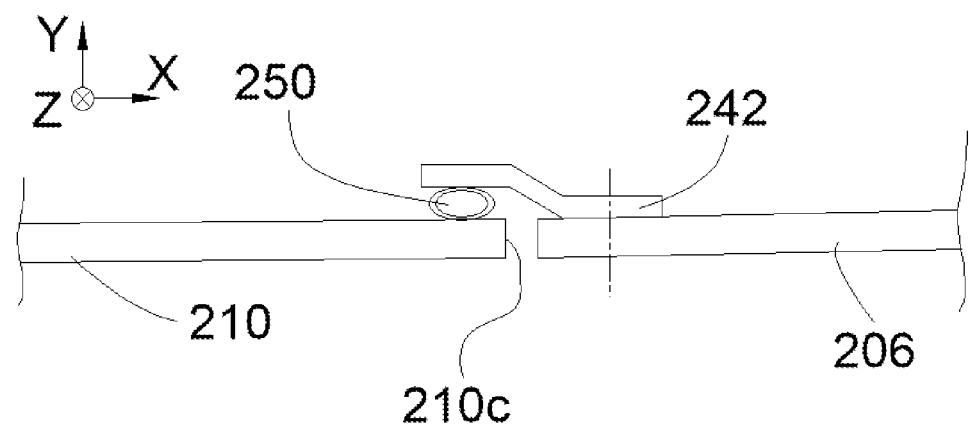
FIG. 5 is a view in section along the line V of a first variant of a holding system for an assembly according to the invention.
Figure 6:
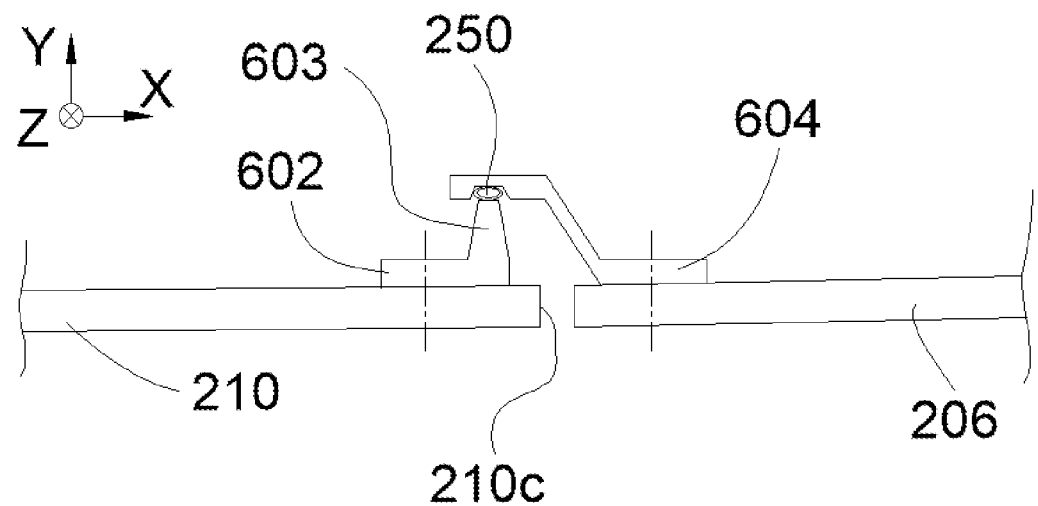
FIG. 6 is a view similar to FIG. 5 for a second variant of the holding system.

FIGS. 5 and 6 show two particular embodiments that serve to ensure leak-tightness along the front edge 210c, wherein the same embodiments also apply to the rear edge 210d.

In the embodiment of FIG. 5, the assembly comprises a seal 250 which is attached to the fixed cowl 210 along the front edge 210c and a front fitting 242 which is attached to the movable cowl 206 and which comprises a continuation which, in the closed position, is against the seal 250 on the opposite side from the fixed cowl 206 so as to compress the seal 250.

In the embodiment of FIG. 6, the assembly comprises a first fitting 602 attached to the movable cowl 210, a second fitting 604 attached to the fixed cowl 206 and a seal 250.

The first fitting 602 comprises a rib 603 which extends parallel to the front edge 210c and whose apex points towards the interior of the nacelle 202.

The seal 250 is attached along a channel which the second fitting 604 comprises to that effect on the side of the movable cowl 210.

In the closed position, the apex of the rib 603 is against the seal 250 on the opposite side from the channel in order to compress the seal 250.

According to an alternative embodiment, already mentioned above, it is also possible to implement cowls 206 and 210 having a multi-layer structure, referred to as a sandwich panel composite structure, that allows the hinges and the locks to be attached to a localized region of increased thickness of the multi-layer structure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for a nacelle of an aircraft, said assembly comprising:
    a fixed cowl configured to be attached to a rigid structure of the nacelle and having an opening forming a window,
    a movable cowl mounted to be able to move on the fixed cowl between a closed position, in which the movable cowl blocks the window, and an open position, in which the movable cowl does not block the window, and comprising an upper edge configured to be oriented towards the top of the nacelle and a lower edge on the opposite side from the upper edge, the movable cowl having a reinforcing rib between the upper edge and the lower edge,
        the fixed cowl comprising an upper reinforcing rib which extends from an upper edge of the window corresponding to the upper edge of the movable cowl and a lower reinforcing rib which extends from a lower edge of the window corresponding to the lower edge of the movable cowl,
    at least one hinge, where each hinge comprises a fixed part formed as a female clevis attached to the upper reinforcing rib along an upper edge of the fixed cowl, a movable part formed as a male fitting attached to the reinforcing rib of the movable cowl, where the movable part is accommodated in the fixed part, and a pin mounted between the fixed part and the movable part and in which each pin is parallel to the upper edge of the movable cowl,
    at least two locks arranged along the lower edge of the movable cowl, where each lock comprises a first part secured to the lower reinforcing rib, a second part secured to the reinforcing rib of the movable cowl, locking means that are movable between a locking position which locks the first part and the second part to one another and an unlocking position in which the first part and the second part are free with respect to one another, and actuation means that are provided to move the locking means from the locking position to the unlocking position and vice versa,
    a fitting to which is attached the fixed part,
    a fitting to which is attached the movable part,
    a fitting to which are attached the first parts, and
    a fitting to which are attached the second parts,
    wherein each fitting is attached to one of the reinforcing rib of the movable cowl, the upper reinforcing rib, and the lower reinforcing rib, and to the movable cowl or the fixed cowl bearing said one of the reinforcing ribs,
    wherein the assembly further comprises
    a seal attached to the fixed cowl along the upper edge and the lower edge of the window, and wherein the fitting to which the movable part is attached comprises, along the upper edge of the movable cowl, an extension which, in a closed position, is against the seal on a side opposite the fixed cowl.

2. The assembly according to claim 1, wherein the fitting to which the second parts are attached comprises, along the upper edge, an extension which, in the closed position, is against the seal on a side opposite the fixed cowl.

3. The assembly according to claim 1, further comprising, along a front edge of the movable cowl,
    at least one further lock, where each further lock comprises a first part secured to the fixed cowl, a second part secured to the movable cowl, locking means that are able to move between a locking position which locks the first part and the second part to one another and an unlocking position in which the first part and the second part are free with respect to one another, and
    actuation means that are provided to move the locking means from the locking position to the unlocking position and vice versa.

4. The assembly according to claim 3,
    wherein the actuation means are a handle that is accessible from outside the nacelle,
    wherein that the handle is able to move between a retracted position, in which the handle is inside a recess provided to that end in the movable cowl or the fixed cowl, and a deployed position, in which the handle is outside said recess and stands proud of the movable cowl or the fixed cowl, and
    wherein the retracted position corresponds to the locking position and the deployed position corresponds to the unlocking position.

5. A nacelle for an aircraft comprising a rigid structure and an assembly according to claim 1, the fixed cowl being attached to the rigid structure.

6. An aircraft comprising at least one nacelle according to the claim 5.

7. An assembly for a nacelle of an aircraft, said assembly comprising:
    a fixed cowl configured to be attached to a rigid structure of the nacelle and having an opening forming a window,
    a movable cowl mounted to be able to move on the fixed cowl between a closed position, in which the movable cowl blocks the window, and an open position, in which the movable cowl does not block the window, and comprising an upper edge configured to be oriented towards the top of the nacelle and a lower edge on the opposite side from the upper edge, the movable cowl having a reinforcing rib between the upper edge and the lower edge, the fixed cowl comprising an upper reinforcing rib which extends from an upper edge of the window corresponding to the upper edge of the movable cowl and a lower reinforcing rib which extends from a lower edge of the window corresponding to the lower edge of the movable cowl, at least one hinge, where each hinge comprises a fixed part formed as a female clevis attached to the upper reinforcing rib along an upper edge of the fixed cowl, a movable part formed as a male fitting attached to the reinforcing rib of the movable cowl, where the movable part is accommodated in the fixed part, and a pin mounted between the fixed part and the movable part and in which each pin is parallel to the upper edge of the movable cowl, at least two locks arranged along the lower edge of the movable cowl, where each lock comprises a first part secured to the lower reinforcing rib, a second part secured to the reinforcing rib of the movable cowl, locking means that are movable between a locking position which locks the first part and the second part to one another and an unlocking position in which the first part and the second part are free with respect to one another, and actuation means that are provided to move the locking means from the locking position to the unlocking position and vice versa, a fitting to which is attached the fixed part, a fitting to which is attached the movable part, a fitting to which are attached the first parts, and a fitting to which are attached the second parts, wherein each fitting is attached to one of the reinforcing rib of the movable cowl, the upper reinforcing rib, and the lower reinforcing rib, and to the movable cowl or the fixed cowl bearing said one of the reinforcing ribs, and, wherein the assembly further comprises a seal attached to the fixed cowl along the upper edge and the lower edge of the window, and wherein the fitting to which the second parts are attached comprises, along the upper edge, an extension which, in the closed position, is against the seal on a side opposite the fixed cowl.

8. An assembly for a nacelle of an aircraft, said assembly comprising:

a fixed cowl configured to be attached to a rigid structure of the nacelle and having an opening forming a window, a movable cowl mounted to be able to move on the fixed cowl between a closed position, in which the movable cowl blocks the window, and an open position, in which the movable cowl does not block the window, and comprising an upper edge configured to be oriented towards the top of the nacelle and a lower edge on the opposite side from the upper edge, the movable cowl having a reinforcing rib between the upper edge and the lower edge, the fixed cowl comprising an upper reinforcing rib which extends from an upper edge of the window corresponding to the upper edge of the movable cowl and a lower reinforcing rib which extends from a lower edge of the window corresponding to the lower edge of the movable cowl, at least one hinge, where each hinge comprises a fixed part formed as a female clevis attached to the upper reinforcing rib along an upper edge of the fixed cowl, a movable part formed as a male fitting attached to the reinforcing rib of the movable cowl, where the movable part is accommodated in the fixed part, and a pin mounted between the fixed part and the movable part and in which each pin is parallel to the upper edge of the movable cowl, at least two locks arranged along the lower edge of the movable cowl, where each lock comprises a first part secured to the lower reinforcing rib, a second part secured to the reinforcing rib of the movable cowl, locking means that are movable between a locking position which locks the first part and the second part to one another and an unlocking position in which the first part and the second part are free with respect to one another, and actuation means that are provided to move the locking means from the locking position to the unlocking position and vice versa, a fitting to which is attached the fixed part, a fitting to which is attached the movable part, a fitting to which are attached the first parts, and a fitting to which are attached the second parts, wherein each fitting is attached to one of the reinforcing rib of the movable cowl, the upper reinforcing rib, and the lower reinforcing rib, and to the movable cowl or the fixed cowl bearing said one of the reinforcing ribs, wherein the assembly further comprises, along a front edge of the movable cowl, at least one further lock, where each further lock comprises a first part secured to the fixed cowl, a second part secured to the movable cowl, locking means that are able to move between a locking position which locks the first part and the second part to one another and an unlocking position in which the first part and the second part are free with respect to one another, and actuation means that are provided to move the locking means from the locking position to the unlocking position and vice versa.

* * * * *